B. C. SEATON.
VEHICLE BODY SUPPORT.
APPLICATION FILED APR. 15, 1916.
1,213,696.
Patented Jan. 23, 1917.
3 SHEETS—SHEET 2.
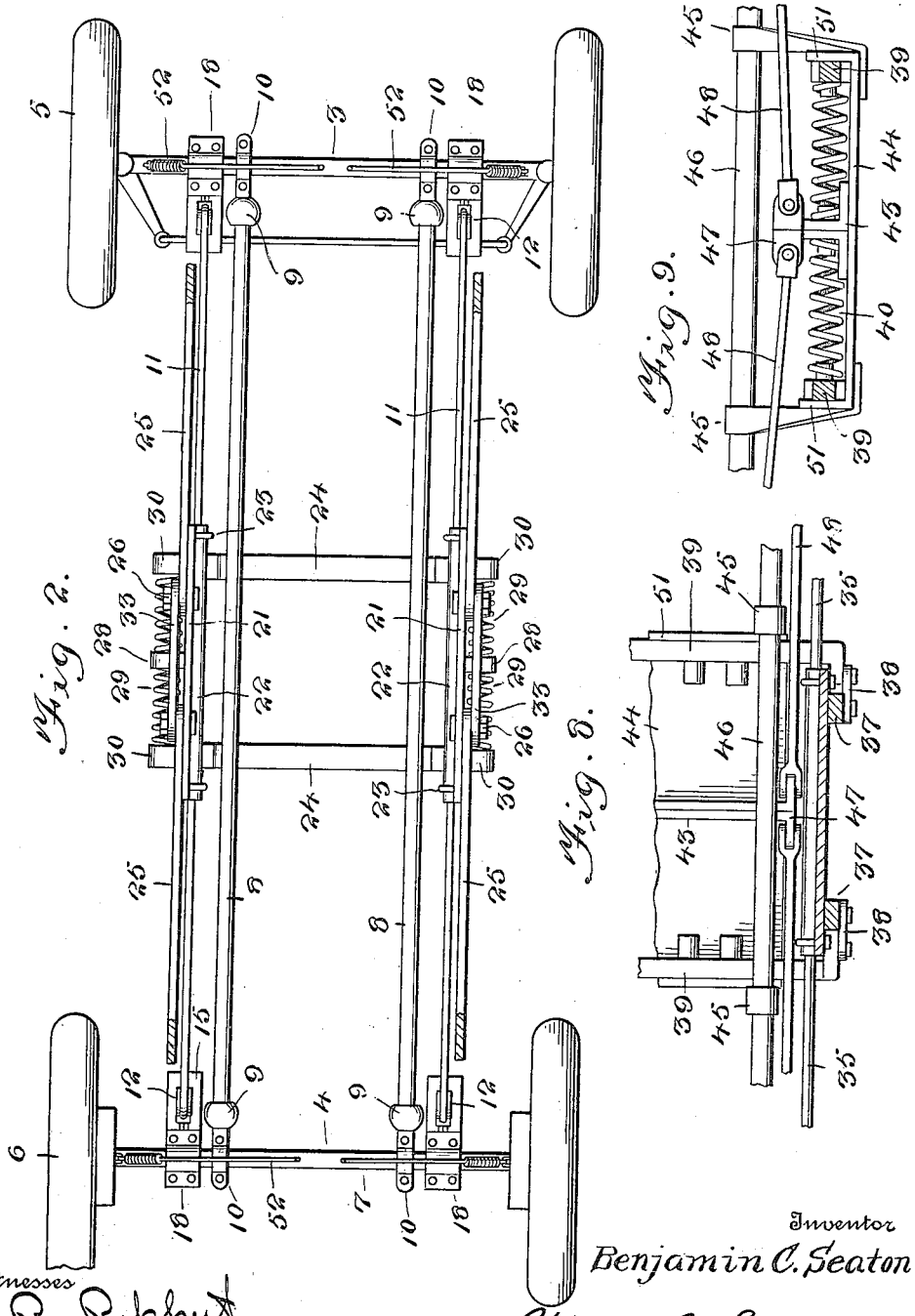
Witnesses
E. R. Ruppert
R. M. Smith
Inventor
Benjamin C. Seaton
By Victor J. Evans
Attorney

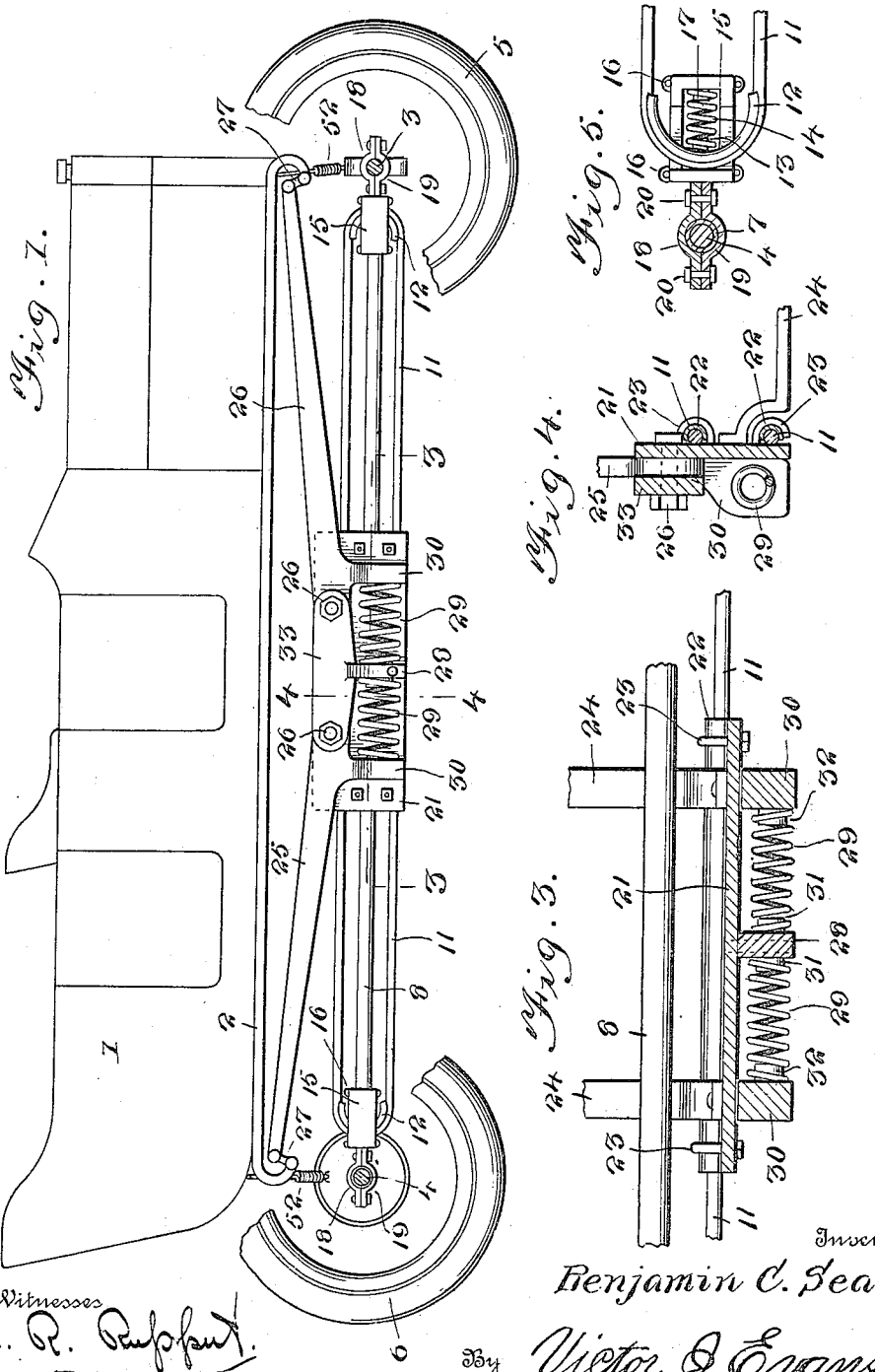

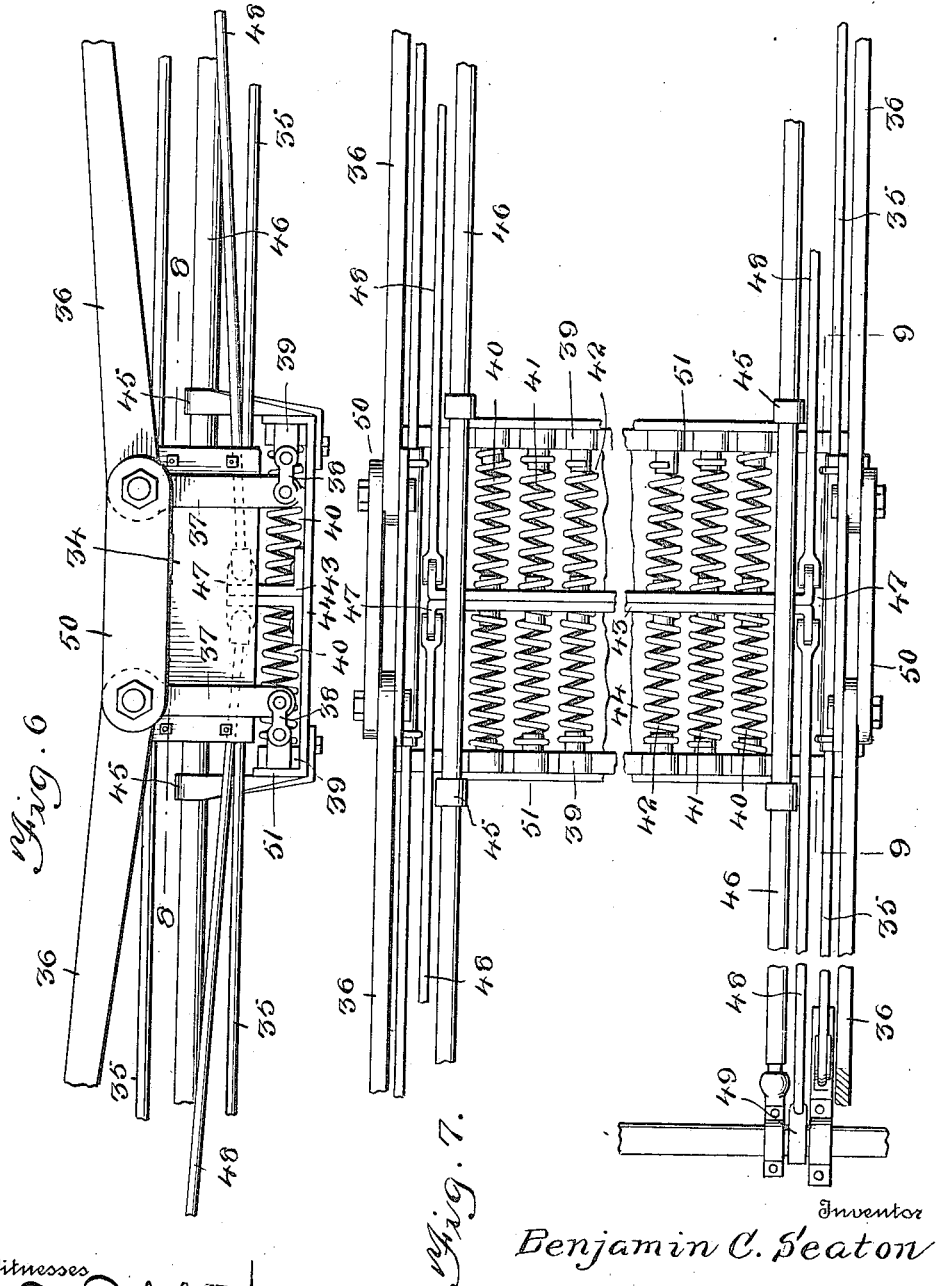

UNITED STATES PATENT OFFICE.

BENJAMIN C. SEATON, OF NASHVILLE, TENNESSEE.

VEHICLE-BODY SUPPORT.

1,213,696.  Specification of Letters Patent.  Patented Jan. 23, 1917.

Application filed April 15, 1916. Serial No. 91,364.

*To all whom it may concern:*

Be it known that I, BENJAMIN C. SEATON, a citizen of the United States, residing at Nashville, in the county of Davidson and State of Tennessee, have invented new and useful Improvements in Vehicle-Body Supports, of which the following is a specification.

This invention relates to vehicle body supports and the mechanism of this invention is applicable to both pleasure and commercial motor vehicles, the broad object in view being to eliminate the usual body supporting springs which are interposed directly between the body and the front and rear axles and to substitute therefor resilient body supporting means including a plurality of independently operable and independently cushioned levers which, when combined under the relative arrangement hereinafter particularly set forth will prevent any twisting action being communicated from the wheel base and axles to the body as in the present day automobile practice where, in the event of one of the wheels dropping into a depression in the road bed or mounting an obstruction, a twist is imparted to the body and chassis or frame of the machine which results in crystallization of certain parts and an untimely deterioration of the machine as a whole.

A further object of the invention is to produce a more highly resilient action between the body of the machine and the wheels and axles thereby producing a car or vehicle which is far more comfortable and easy riding where used as a passenger vehicle and which is far more durable and practical as applied to commercial vehicles including light and heavy trucks. Incidentally, much greater mileage is obtained for each tire employed and the general expense of upkeep or maintenance of the vehicle is materially reduced.

Another object of the invention is to produce a construction which will obtain the results above outlined and which will at the same time greatly increase the life and durability of all parts of the car and which will practically eliminate the transmission of vibration from the engine to the car body and wheel base.

In the construction of the common type of motor vehicles and trucks, elliptical or partly elliptical springs connect the axle directly to the body of the car, the springs being usually bolted to the axle and car body. When a wheel falls into a depression in the road bed or meets an obstruction, the weight of the load is lifted practically the same height as the obstruction over which the wheel passes or is dropped to an extent approximately equal to the depth of the depression in the road. Incidentally, in the use of such elliptical springs directly connecting the body and axles, a twist is given to the car body and frame or chassis which tends to break the joints of the body and frame, resulting in rapid deterioration of the frame and body and producing excessive and unnecessary strains on the bolts, rivets and other fasteners and particularly on the bolts which connect the springs to the body. By the application of the principles of this invention, all of the stiffness and rigidity due to the construction referred to is eliminated enabling the body of the machine to travel with a flexible gliding movement even upon a rough and uneven road.

In the accompanying drawings:—Figure 1 is a side elevation partly in section of a motor vehicle showing the body suspension mechanism of this invention in its applied relation to the body and axles. Fig. 2 is a plan view of the same omitting the frame and body and showing the body supporting levers in section. Fig. 3 is a fragmentary horizontal section on an enlarged scale taken on the line 3—3 of Fig. 1. Fig. 4 is a fragmentary vertical section on an enlarged scale taken on the line 4—4 of Fig. 1. Fig. 5 is a fragmentary side elevation partly in section showing one of the cable stretching devices. Fig. 6 is a partial side elevation of the body supporting means adapted especially for trucks or commercial vehicles. Fig. 7 is a plan view of the same. Fig. 8 is a horizontal section on the line 8—8 of Fig. 6. Fig. 9 is a vertical longitudinal section on the line 9—9 of Fig. 7.

Referring to the drawings 1 designates the body of a motor vehicle of the usual touring type and 2 is the body supporting frame or chassis thereof.

3 designates the front axle, 4 the rear axle, 5 the front wheels and 6 the rear wheels.

The parts thus far described are of the usual construction and relative arrangement.

In carrying out this invention, the front axle 3 and the housing 7 of the rear axle are connected by struts 8 which as shown in Fig. 2 are in parallel and spaced relation to each other, each of said struts being provided adjacent to the opposite extremities thereof with ball and socket joints 9 and clamps 10 to embrace the front axle and the rear axle housing. These struts 8 are employed to prevent the front and rear axles from being drawn toward each other by the body supporting means hereinafter described while the ball and socket joints 9 admit of the relative rocking movement of the front and rear axles which is caused by one or more of the wheels dropping into a depression or riding over an obstacle.

Flexible supporting members such as cables 11 extend in substantially parallel relation to each other and to the struts 8 as shown in Figs. 1 and 2, each of said cables being perfectly endless. At each end, the curved portion of each cable passes around a curved guide 12 which is preferably grooved to form a seat for the cable as best illustrated in the detail view Fig. 5. The guide 12 is provided with a stud 13 around which is placed one end of a cable stretching element 14 shown in the form of a coiled spring which is contained within a two part or sectional housing 15 the sections of which are bolted together, each of the sections of the housing 15 being formed with projecting ears 16 formed with holes to receive the necessary clamping bolts. Within one end of the housing 15 is a stud 17 over which fits the opposite end of the cable stretching member 14. The housing 15 is connected to the adjacent axle or axle housing as the case may be by means of a two part or sectional clamp, one section 18 of which is preferably formed as an integral part of the housing 15 while the other section 19 of the clamp is connected to the section 18 by means of bolts 20 or the equivalent thereof. This enables the clamp to be placed around the axle or axle housing so as to fasten the housing 15 in fixed relation thereto under the arrangement shown in Figs. 1 and 2. The springs or cable stretching members 14 serve to keep the cables 11 stretched taut, the strength of the springs 14 depending of course upon the weight of the body of the vehicle and the load to be carried thereby according to the purpose for which the machine as a whole is designed.

Fixedly secured to the cables 11 about midway of the length thereof are main body supporting members 21 which are shown in the form of plates. Each of said members is fastened to the top and bottom portions of the respective cable 11 by means of semi-cylindrical clamping members 22 secured in fixed relation to the adjacent main body supporting member by means of bolts 23 which are shown as of such formation as to embrace the clamps 22 adjacent to the opposite ends thereof as indicated in Fig. 3. Any other means may, however be employed for fastening the main body supporting members to the cables. The body supporting members 21 are connected by tie bars 24 which extend transversely of the machine and beneath the struts 8.

At each side of the machine there are employed two body supporting levers 25 which are best shown in Fig. 1. These levers are connected by pivots 26 to the respective body supporting member 21 at their inner ends while the outer extremities of said levers 25 are connected by shackles or pivotal links 27 to the front and rear ends of the frame 2 which supports the body 1. About centrally of its length, each body supporting member 21 is provided with a laterally extending abutment 28 against which bear the inner adjacent extremities of cushioning members 29 shown in the form of coiled springs. The outer ends of these cushioning members bear against compression arms 30 extending downwardly from and forming parts of the body supporting levers 25. Spring holding studs 31 are preferably formed on the opposite sides of the abutment 28 and other studs 32 are formed on the adjacent faces of the arms 30 for the purpose of holding the springs or cushioning members 29 in place. The abutment 28 is formed with a T-shaped head or extension 33 which receives the pivots 26 above referred to and serves as a tie plate to connect said pivots, adding materially to the strength of the body supporting mechanism at such point.

From the foregoing description, taken in connection with the accompanying drawings it will now be understood that the body 1 and the frame 2 are supported by the free extremities of the levers 25. These levers are in turn pivotally connected to and supported by the main body supporting members 21 and are normally held in the position illustrated in Fig. 1 by means of the cushioning members 29. The main body supporting members 21 which are tied together by the cross bars 24 are in turn supported by the flexible cables 11. These cables are in turn supported by the front and rear axles to which they are flexibly or yieldingly connected by means of the cable stretching members 14 in connection with the attaching means whereby said springs are supported in relation to the front and rear axles. Therefore, when the body of the vehicle is depressed by one or more wheels dropping into a depression or when the wheels, one or more, are elevated by passing over an obstruction, there is a relative up and down movement between the body and the wheels and their axles. In such relative movement of the parts referred to, the levers 29 rock on their pivots 26 causing the compression arms 30 to act on the cushioning members 29 thereby taking up the shock, this being contributed to by the flexible cables 11 and the cable stretching members 14. This provides a very elastic flexible or resilient connection between the axles of the wheels and the body of the vehicle and enables each wheel to act independently of all the others so that any wheel may drop into a depression or pass over an obstacle without imparting any appreciable movement to the body of the machine, this being due to the fact that the movement of the axle has to be transmitted through the cable stretching member 14, the cable 11, one of the cushioning members 29 and one of the levers 25 before reaching the body supporting frame. Before this circuitous transmission of movement is completed, the wheel referred to has passed beyond the depression or obstruction and consequently little or no movement is imparted to the body supporting frame and the body imposed thereon. As there are four wheels and four body supporting levers each independently cushioned, each wheel may act without disturbing any of the other wheels and this avoids any twisting strain being imparted to the body and body supporting frame thus adding materially to the life and durability of the car as a whole. Furthermore, the action is easy on the wheel base in that it is not subjected to the heavy strains ordinarily imparted thereto by reason of the springs at present in use which directly connect the body frame with the axles.

In Figs. 6 to 9 inclusive, the principles of the invention are shown applied to a commercial vehicle such as a truck. Under this arrangement I employ the same main body supporting members 34 bearing the same relation to the cables 35 as in the preceding figures, and I employ the same body supporting levers 36 mounted in the same relation to the members 34. Instead of having the compression arms 37 bear directly against the cushion members as previously described and shown, the arms 37 which correspond with the arms 30 in Fig. 1, for example, are connected by links 38 to the opposite extremities of a pair of spring compressing members 39 shown in the form of cross bars extending transversely of the machine frame and adapted to act against the outer extremities of several series of cushioning members 40, 41 and 42, the inner ends of which bear against an abutment shown as consisting of two transversely extending members 43 of angle iron shape, having their bottom flanges facing in opposite directions and supported by a bottom plate 44 which is suspended by hangers 45 from the struts 46 corresponding with the struts 8 of Figs. 1 and 2. At their opposite ends, the abutment members 43 are provided with oppositely extending ears 47 and connected at their inner ends to these ears are truss rods 48 which extend toward the front and rear of the vehicle where they are connected to collars 49 embracing the front axle and rear axle housing as indicated in Fig. 7. 50 designates a tie plate corresponding with the member 33 shown in Fig. 1 and having the same function. The cushioning members or springs 40 are shown as of sufficient length to always bear against the abutment 43 and the spring compressing members 39 which are both movable toward and away from the abutment 43 as clearly indicated in Fig. 6. These springs 40 are so designed and of such strength as to support the vehicle body without any load thereon. The next series of springs 41 is brought into play when a partial load is imposed on the body of the vehicle thereby assisting the springs 40 in resiliently supporting the body. The remaining series of springs 42 is brought into use when the body contains its full load at which time all of the series of springs or cushioning members are contributing to the support of the body and its load.

It will, of course, be understood that any number of series of springs may be employed in accordance with the load designed to be carried by the vehicle. The springs thus compensate for loads of different weights while under the ordinary construction of trucks and commercial vehicles, the same springs are employed whether a full load is being carried or the truck is entirely empty. Therefore, under the ordinary construction, when there is no load being carried by the truck, the springs at present in use are practically rigid and inflexible connections between the axles and the body, causing the machine as a whole to deteriorate rapidly.

By the arrangement shown and described hereinabove, the different loads are compensated for and even when there is no load whatever on the truck, there is still a resilient support for the body enabling considerable speed to be attained without injurious effects on the mechanism, frame and body of the machine. The front and rear end portions of the bottom plate 44 are upturned to form stop flanges 51 for limiting the outward movement of the spring compressing members 39 under the expansive action of the springs which are interposed between said spring compressing members and the centrally located abutment members 43.

It will now be apparent that the direct thrust between the axles and the body is eliminated by doing away with the usual elliptical or semi-elliptical springs which directly connect said parts. This also avoids the direct lifting or dropping of the load imposed on the machine in passing over obstructions or meeting depressions in the road bed. This results in a much greater tire mileage, longer life of the car and a material reduction in the expense of upkeep. The car is rendered easier riding and more comfortable to the occupants, the cost of the general construction of the car is also reduced, vibrations of all kinds and from all causes are to a great extent eliminated and the very objectionable and destructive twisting action of the body and frame of the car is done away with. Resilient stays 52 are interposed between each axle and the vehicle body as illustrated in Figs. 1 and 2 to yieldingly take up lateral movement of the body in relation to the axles.

I claim:—

1. The combination with the front and rear axles of a vehicle, and a vehicle body, of struts holding said axles at a fixed distance from each other, flexible elements extending between and connected with the front and rear axles, main body-supporting members supported by said flexible elements, body-supporting levers having a jointed connection with the vehicle body and the main body-supporting members, and cushioning means for said body supporting levers.

2. The combination with the front and rear axles of a vehicle, and a vehicle body, of struts holding said axles at a fixed distance from each other having a universal jointed connection with said axles, flexible elements extending between and connected with the front and rear axles, main body-supporting members supported by said flexible elements, body-supporting levers having a jointed connection with the vehicle body and the main body-supporting members, and cushioning means for said body supporting levers.

3. The combination with the front and rear axles of a vehicle, and a vehicle body, of struts holding said axles at a fixed distance from each other, flexible elements extending between and yieldingly connected with the front and rear axles, main body-supporting members supported by said flexible elements, body-supporting levers having a jointed connection with the vehicle body and the main body-supporting member, and cushioning means for said body-supporting levers.

4. The combination with the front and rear axles of a vehicle, and a vehicle body, of cables extending between said axles and supported thereby, and body supporting connections yieldingly supported by said cables.

5. The combination with the front and rear axles of a vehicle, and a vehicle body, of cables extending between said axles and supported thereby, and body supporting connections yieldingly supported by said cables including cushioning members.

6. The combination with the front and rear axles of a vehicle, and a vehicle body, of cables extending between said axles and supported thereby, and independently operable body supporting connections yieldingly supported by said cables including cushioning means.

7. The combination with the front and rear axles of a vehicle, and a vehicle body, of endless cables extending between said axles and yieldingly supported thereby, and body supporting connections yieldingly supported by said cables.

8. The combination with the front and rear axles of a vehicle, and a vehicle body, of struts holding said axles at a fixed distance from each other, flexible elements extending between and connected with the front and rear axles, main body-supporting members supported by said flexible elements, body-supporting levers having a jointed connection with the vehicle body and the main body-supporting members, spring supporting abutments, and cushions interposed between said abutments and the body-supporting levers.

9. The combination with the front and rear axles of a vehicle, and a vehicle body, of struts holding said axles at a fixed distance from each other, flexible elements extending between and connected with the front and rear axles, main body-supporting members supported by said flexible elements, tie-members connecting said main body supporting members and extending under the struts, body-supporting levers having a jointed connection with the vehicle body and the main body-supporting members, and cushioning means for said body supporting levers.

10. The combination with the front and rear axles of a vehicle, and a vehicle body, of struts holding said axles at a fixed distance from each other, flexible elements extending between and connected with the front and rear axles, main body-supporting members supported by said flexible elements, body-supporting levers having a jointed connection with the vehicle body and the main body-supporting members, and cushioning means for said body supporting levers, including a plurality of cushions arranged to be successively thrown into action as the load is increased.

11. The combination with the front and rear axles of a vehicle, and a vehicle body, of struts holding said axles at a fixed distance from each other, flexible elements extending between and connected with the front and rear axles, main body-supporting members supported by said flexible elements, body-supporting levers having a jointed connection with the vehicle body and the main body-supporting members, cushioning means for said body supporting levers, including a plurality of cushions arranged to be successively thrown into action as the load is increased, and cushion compressing members actuated by said body supporting levers.

12. The combination with the front and rear axles of a vehicle, and a vehicle body, of struts holding said axles at a fixed distance from each other, flexible elements extending between and connected with the front and rear axles, main body-supporting members supported by said flexible elements, body-supporting levers having a jointed connection with the vehicle body and the main body-supporting members, cushioning means for said body supporting levers, including a plurality of cushions arranged to be successively thrown into action as the load is increased, cushion compressing members actuated by said body supporting levers, and an abutment by which the thrust on the cushions is sustained.

In testimony whereof I affix my signature.

BENJAMIN C. SEATON.

Copies of this patent may be obtained for five cents each, by addressing the "Commissioner of Patents, Washington, D. C."